US012591933B1

(12) United States Patent
Moseley, III et al.

(10) Patent No.: US 12,591,933 B1
(45) Date of Patent: Mar. 31, 2026

(54) REAL-TIME NATIVE MOBILE APPLICATION USER EXPERIENCE

(71) Applicant: United Services Automobile Association (USAA), San Antonio, TX (US)

(72) Inventors: Thomas James Moseley, III, Bluffton, SC (US); Lane Kent Anderson, Peoria, AZ (US); Regan Hoffman, Wadsworth, OH (US)

(73) Assignee: United Services Automobile Association (USAA), San Antonio, TX (US)

( * ) Notice: Subject to any disclaimer, the term of this patent is extended or adjusted under 35 U.S.C. 154(b) by 68 days.

(21) Appl. No.: 18/390,955

(22) Filed: Dec. 20, 2023

Related U.S. Application Data

(60) Provisional application No. 63/433,816, filed on Dec. 20, 2022.

(51) Int. Cl.
*G06F 3/01* (2006.01)
*G06Q 40/08* (2012.01)
(52) U.S. Cl.
CPC ............... *G06Q 40/08* (2013.01); *G06F 3/01* (2013.01)

(58) Field of Classification Search
CPC ..................................... G06F 3/01; G06F 3/00
See application file for complete search history.

(56) References Cited

U.S. PATENT DOCUMENTS

2016/0062620 A1* 3/2016 Simon ............... H04M 1/72403
715/767

* cited by examiner

*Primary Examiner* — Edward Chang
(74) *Attorney, Agent, or Firm* — Fletcher Yoder, P.C.

(57) ABSTRACT

A computer-implemented method includes receiving, via processing circuitry, first data indicative of a plurality of views to be included in an application. The plurality of views corresponds to a plurality of user interfaces of the application, and each view of the plurality of views has a respective formatting. The computer-implemented method also includes receiving, via the processing circuitry, second data indicative of one or more data sources for the plurality of views or text to be included in the plurality of views. Additionally, the computer-implemented method includes generating, via the processing circuitry, instances of the plurality of views based on the first data and the second data. The instances of the plurality of views correspond to the plurality user interfaces of the application. Furthermore, the computer-implemented method includes generating, via the processing circuitry, the application. The application includes the instances of the plurality of views.

20 Claims, 8 Drawing Sheets

Figure 3B:
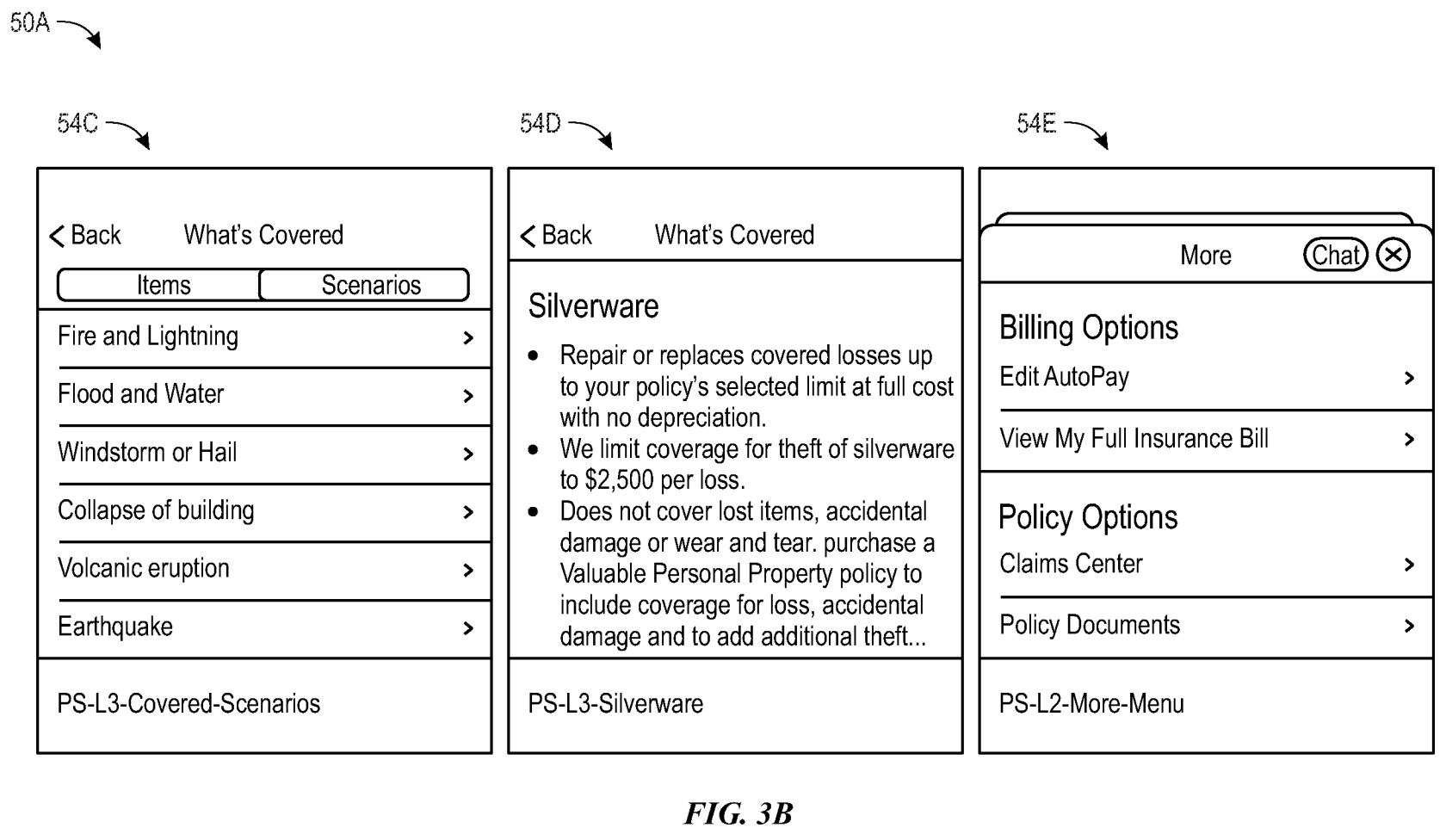

50A

54C

< Back    What's Covered

| Items | Scenarios |
|---|---|

Fire and Lightning            ^

Flood and Water               ^

Windstorm or Hail             ^

Collapse of building          ^

Volcanic eruption             ^

Earthquake                    ^

PS-L3-Covered-Scenarios

54D

< Back    What's Covered

Silverware

- Repair or replaces covered losses up to your policy's selected limit at full cost with no depreciation.
- We limit coverage for theft of silverware to $2,500 per loss.
- Does not cover lost items, accidental damage or wear and tear. purchase a Valuable Personal Property policy to include coverage for loss, accidental damage and to add additional theft...

PS-L3-Silverware

54E

More                    Chat  (X)

Billing Options

Edit AutoPay                  ^

View My Full Insurance Bill   ^

Policy Options

Claims Center                 ^

Policy Documents              ^

PS-L2-More-Menu

‹ Back     Home Details

| General | Interior | Exterior |

Outside Your Home

| Exterior Wall Construction | Brick Veneer - 60% Cedar Siding - 40% |
| Foundation Construction | Slab - 100% |
| Garage | Attached - 2 Car |
| Roof Type | Composition (3-Tab) - 100% |

HO-PS-Home-Details- 3 IOS

54I

‹ Back     General Home Details

Estimated Rebuild Cost

$290,000 calculated dwelling rebuild cost
The dwelling value reflects our estimated cost to rebuild your home if it is destroyed by a covered event. If you suffer a loss, it is our responsibility to repair or rebuild your home to the condition it was prior to the loss. The value is based on the home characteristics you provided and includes cost of labor and materials and code requirements. It does not, however, consider the market value of the property or the cost of the land.

HO-Ps-Home-Details-Gener...

54J

‹ Back     Billing Summary

Premium Breakdown

| Annual Premium | $1,490.04 |

| Estimated Monthly Premium | $124.17 |

| Total Discounts | $150.00 |
| Home Age Discount | $28.23 |
| Claims Free Discount | $55.79 |
| Premises Alarm/Protection Device | $65.98 |

| Total Savings | $100.00 |
| Good Payment History | |
| Membership Loyalty | |
| Multiple USAA Products | |

HO-PS-Billing-Summary IOS

Home Details

‹ Back    Home Details

| General | Interior | Exterior |

Outside Your Home

| Exterior Wall Construction | Brick Veneer - 60% Cedar Siding - 40% |
| Foundation Construction | Slab - 100% |
| Garage | Attached - 2 Car |
| Roof Type | Composition (3-Tab) - 100% |

RPI-PS-Home-Details- 3 IOS

54N ⟶

‹ Back    General Home Details

Estimated Rebuild Cost $290,000 calculated dwelling rebuild cost The dwelling value reflects our estimated cost to rebuild your home if it is destroyed by a covered event. If you suffer a loss, it is our responsibility to repair or rebuild your home to the condition it was prior to the loss. The value is based on the home characteristics you provided and includes cost of labor and materials and code requirements. It does not, however, consider the market value of the property or the cost of the land.

RPI-Ps-Home-Details-Gener...

54O ⟶

‹ Back    Billing Summary

Premium Breakdown

| Annual Premium | $1,490.04 |
| Estimated Monthly Premium | $124.17 |
| Total Discounts | $150.00 |
| Home Age Discount | $28.23 |
| Claims Free Discount | $55.79 |
| Premises Alarm/Protection Device | $65.98 |
| Total Savings | $100.00 |
| Good Payment History | |
| Membership Loyalty | |
| Multiple USAA Products | |

RPI-PS-Billing-Summary IOS

REAL-TIME NATIVE MOBILE APPLICATION USER EXPERIENCE

CROSS-REFERENCE TO RELATED APPLICATIONS

This application claims priority to and the benefit of U.S. Provisional Application No. 63/433,816, entitled "REAL-TIME NATIVE MOBILE APPLICATION USER EXPERI-ENCE," filed Dec. 20, 2022, which is herein incorporated by reference in its entirety for all purposes.

BACKGROUND

In website and application design (e.g., for mobile applications), there may be elements that are repetitive or similar to one another. For example, an application may have similar layouts of elements in user interfaces that differ in appearance (e.g., text), and the elements may be associated with different data sources. Traditionally, each section or portion of a website or application may be designed separately, regardless of whether there are repetitive elements. For example, after designing one section or portion, another portion that has a similar appearance may be designed din an independent process that may utilize an undesirable amount of resources (e.g., hours of work, financial resources, etc.). Accordingly, it may be beneficial to simplify the design and development of websites and (mobile) applications.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a computer-implemented method includes receiving, via processing circuitry, first data indicative of a plurality of views to be included in an application. The plurality of views corresponds to a plurality of user interfaces of the application, and each view of the plurality of views has a respective formatting. The computing-implemented method also includes receiving, via the processing circuitry, second data indicative of one or more data sources for the plurality of views or text to be included in the plurality of views and generating, via the processing circuitry, instances of the plurality of views based on the first data and the second data. The instances of the plurality of views correspond to the plurality user interfaces of the application. Furthermore, the computer-implemented method includes generating, via the processing circuitry, the application. The application includes the instances of the plurality of views.

In another embodiment, a non-transitory computer-readable medium includes instructions that, when executed, cause processing circuitry to receive first data indicative of a plurality of views to be included in an application. The plurality of views corresponds to a plurality of user interfaces of the application, and each view of the plurality of views has a respective formatting. When executed, the instructions also cause the processing circuitry to receive second data indicative of one or more data sources for the plurality of views or text to be included in the plurality of views and generate instances of the plurality of views based on the first data and the second dat. The instances of the plurality of views correspond to the plurality user interfaces of the application. Moreover, when executed, the instructions cause the processing circuitry to generate the application. The application comprises the instances of the plurality of views.

In yet another embodiment, a computing system includes processing circuitry; and a non-transitory computer-readable medium including instructions that, when executed, cause processing circuitry to receive first data indicative of a plurality of views to be included in an application. The plurality of views corresponds to a plurality of user interfaces of the application, wherein each view of the plurality of views has a respective formatting. When executed, the instructions also cause the processing circuitry to receive second data indicative of one or more data sources for the plurality of views or text to be included in the plurality of views and generate instances of the plurality of views based on the first data and the second dat. The instances of the plurality of views correspond to the plurality user interfaces of the application. Moreover, when executed, the instructions cause the processing circuitry to generate the application. The application comprises the instances of the plurality of views.

BRIEF DESCRIPTION OF THE DRAWINGS

Various aspects of this disclosure may be better understood upon reading the following detailed description and upon reference to the drawings in which:

FIG. 3A and FIG. 3B are an image of views and subviews that may be included in a generated application, according to embodiments of the present disclosure;

FIG. 4A and FIG. 4B are another image of views and subviews that may be included in a generated application, according to embodiments of the present disclosure;

FIG. 5A and FIG. 5B are yet another image of views and subviews that may be included in a generated application, according to embodiments of the present disclosure;

DETAILED DESCRIPTION OF SPECIFIC EMBODIMENTS

Figure 1:
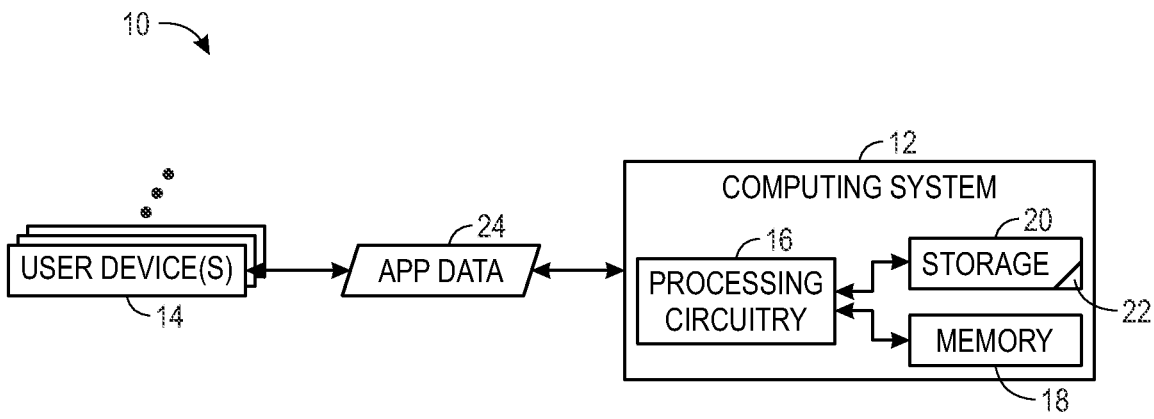
FIG. 1 is a block diagram of a system that may generate an application, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing circuitry," "processing device," and "computing device" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, a keyboard, a video camera or other image or motion capture device, a remote motion capture system, and a wearable motion capture system. Furthermore, in the exemplary embodiment, additional output channels may include, but are not be limited to, an operator interface monitor, a heads-up display, tactile output system, and/or an acoustic output system. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The present disclosure relates generally to several techniques that may be utilized to generate applications or websites. As an example provided in the context of an application, the application may be developed from a library of views and subviews (e.g., views accessible from another view) which may correspond to pages of the application that may be displayed on a user interface for the application on an electronic device. The views and subviews may be defined such that once other data for the views and subviews (e.g., text to appear in the UI, one or more data sources for the views and subviews, the relationships between the views and subviews) are provided (e.g., by a developer of the application), the views and subviews may be generated and included in the application. As such, rather than uniquely designing the views or subviews, using partially pre-defined views and subviews may enable applications (e.g., mobile applications) and websites to be developed more easily and more quickly.

With the foregoing in mind, FIG. 1 is a block diagram of system 10 that includes a computing system 12 and one or more user devices 14. The computing system 12 may be an internet or cloud based system that is communicatively coupled to the user devices 14 via a wired or wireless connection, such as, but not limited to an Ethernet connection, a Wi-Fi® connection, a BLUETOOTH® connection, a wired or wireless connection to a location area network (LAN), a cellular network (e.g., a 3G, a 4G, a 5G network), any suitable wired or wireless connection.

The computing system 12 may include processing circuitry 16, which may include one or more general purpose central processing units (CPUs), one or more graphics processing units (GPUs), one or more microcontrollers, one or more reduced instruction set computer (RISC) processors, one or more ASICs, one or more PLCs, one or more field programmable gate arrays (FPGAs), one or more digital signal processing (DSP) devices, and/or any combination thereof as well as any other circuit or processing device capable of executing the functions described herein. The computing system 12 may also include memory 18 and storage 20. The memory 18 and storage 20 may individually include a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used.

In the illustrated embodiment, the storage 20 may include an application, which may include machine-readable instructions that can be executed by the processing circuitry 16 to generate application data 24, which may be sent to the user devices 14 by the computing system 12. The application 22 be software for a computer or another device, such as, but not limited to, a phone (e.g., a smartphone), a tablet, a virtual reality or augmented reality device, or any other suitable electronic device. The application data 24 may include data for the application 22 that can be sent to the user devices 14 to enable one or more of the user devices 14 to display content related to the application 22 (e.g., after accessing a mobile version of the application 22 included on the user device 14) on the user devices 14. The computing system 12 may also receive the application data 24 from the user devices 14, for example, when a user interacts with the application 22 as presented on the user device 14. For instance, when a user interacts with a graphical user interface (GUI) item that can be displayed on the user device 14, the application data 24 may be generated and sent to the computing system 12. In such as case, the application data 24 may include data that is input by a user or be indicative of a user's selection or interaction with a particular GUI item.

The user device 14 may be any electronic device suitable for displaying a user interface (e.g., a GUI), such as a personal computer (e.g., a desktop or laptop), a smart phone, a smart watch, and so forth. In some embodiments, the user device 14 may include a touch screen that displays the user interface. Furthermore, the user devices 14 may be one or more computing devices that include one or more processors (e.g., microprocessors) and one or more memory and/or storage devices. The one or more processors may execute software programs and/or instructions to facilitate performance of the techniques described herein. Moreover, the one or more processors may include multiple microprocessors, one or more "general-purpose" microprocessors, one or more special-purpose microprocessors, and/or one or more application specific integrated circuits (ASICS), or some combination thereof. For example, the one or more processors may include one or more reduced instruction set (RISC) processors. The one or more memory devices may store information such as control software, look up tables, configuration data, databases, etc. The one or more memory devices may include a tangible, non-transitory, machine-readable-medium, such as a volatile memory (e.g., a random access memory (RAM)) and/or a nonvolatile memory (e.g., a read-only memory (ROM)). The one or more memory devices may store a variety of information and may be used for various purposes. For example, the one or more memory devices may store machine-readable and/or processor-executable instructions (e.g., firmware or software) for the one or more processors, respectively, to execute, such as instructions for determining and providing electronic services. The one or more memory devices may include one or more storage devices (e.g., nonvolatile storage devices) that may include read-only memory (ROM), flash memory, a hard drive, or any other suitable optical, magnetic, or solid-state storage medium, or a combination thereof. Accordingly, the user devices 14 may each include one or more processors that execute instructions stored on a non-transitory computer-readable medium that is included as part of the user devices 14 or otherwise communicatively coupled to the one or more processors of the user devices 14. Moreover, the user devices 14\may each include input devices (e.g., buttons, switches, touchscreens, etc.) that a user can interact with to provide user input to the user devices 14. Furthermore, the user devices 14 may include communication circuitry (e.g., transceiver circuitry, one or more antennas) that enables the user devices 14 to receive and transmit signals (e.g., wirelessly or via a wired connection). For example, the communication circuitry may be utilized to enable communication between the user device 14 and computing system 12.

The application 22 may also include data or computer-readable instructions that are utilized for the application 22. As such, the storage 20 may include data that is utilized for or in conjunction with the application 22. In some cases, such data may include the application data 24 or data (e.g., computer-readable instructions) that are utilized to generate the application data 24.

Figure 2:
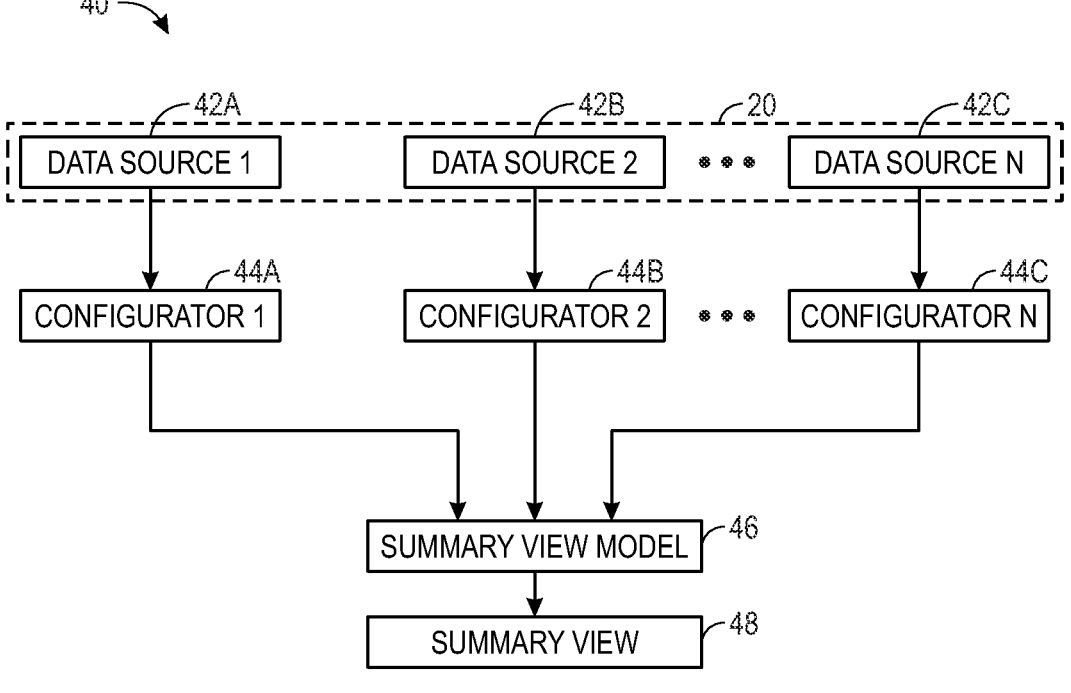
FIG. 2 is a block diagram of data representation of the application of FIG. 1 that may be utilized to generate applications, according to embodiments of the present disclosure.

Bearing the foregoing in mind, FIG. 2 is a block diagram of data representation 40 of the application 22. The data representation 40 includes data sources 42 (referring collectively to data source 42A, data source 42B, and data source 42C), configurators 44 (referring collectively to configurator 44A, configurator 44B, and configurator 44C), a summary view model 46, and a summary view 48. The data sources 42 may be included in the storage 20, and the data sources may be particular data for the application 22 related to a specific portion of the application 22. Here, the specific portion may refer to a view within the application 22 when accessed by one or more of the user devices 14 (e.g., via a website or a mobile application executed on the user device 14). To help provide more context, portions of FIGS. 3-5 will be discussed. However, before discussing FIGS. 3-5, it should be noted that views and subviews can be generated from a view or subview. In other words, the views and subviews discussed below with respect to FIGS. 3-5 may be particular instances of views and subviews that can be generates using an object or class for a view or subview that defines particular features and/or elements of the view (or subview) and, therefore, any instance of the view or subview. Furthermore, while FIGS. 3-5 pertain to the context of an insurance application, it should be noted that these are provided for examples and content into what views or subviews may be or include. As such, in other embodiments, other types of applications may be utilized, and the techniques described herein may be utilized in the development of such applications.

Figure 3A:
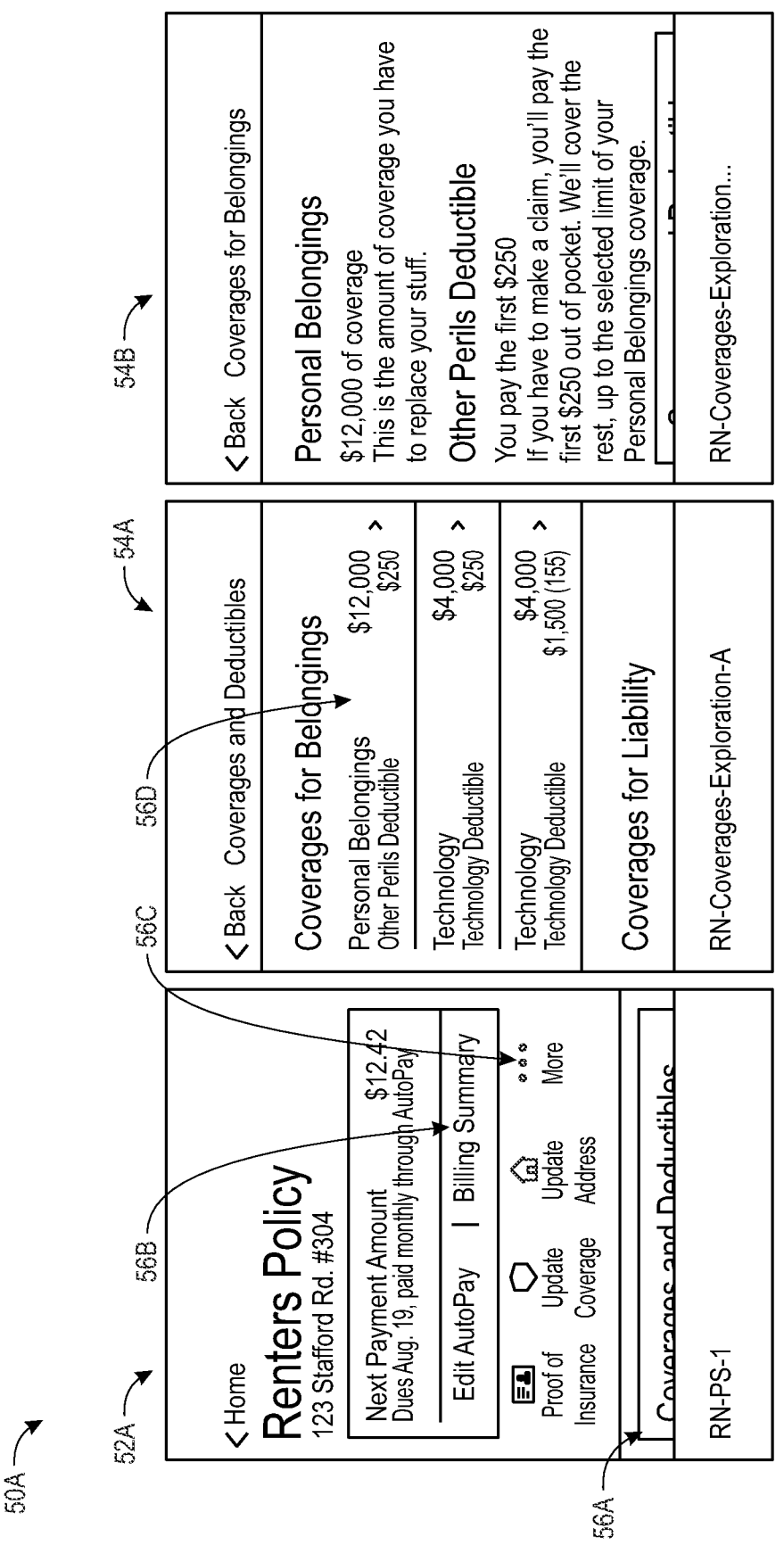

FIG. 3A and FIG. 3B are an image 50A that includes view 52A and subviews 54A, 54B, 54C, 54D, 54E (which may collectively be referred to as "subviews 54"). The view 52A is for a renters insurance policy, and more information or details regarding the policy may be accessed by a user interaction with one or more user interface (UI) elements 56 (collectively referring to UI elements 56A, 56B, 56C) included in the view 52A. For example, a user may select UI element 56A to be presented with the subview 54A, which is a subview for coverages and deductibles. Alternatively, the user may select UI element 56B to view a subview for a billing summary or UI element 56C to view the subview 54E, which is a subview for more options that the user may edit. The subview 54C may be accessed via a user interaction with another UI element that may be included in the view 52A, and the subview 54D may be accessed via a user interaction with a UI element in the subview 54C. In other words, subviews may be navigated to via other subviews. Indeed, Subview 54B may be accessed by a user interaction with UI element 56D to view coverages for belongings of the user.

Figure 4A:
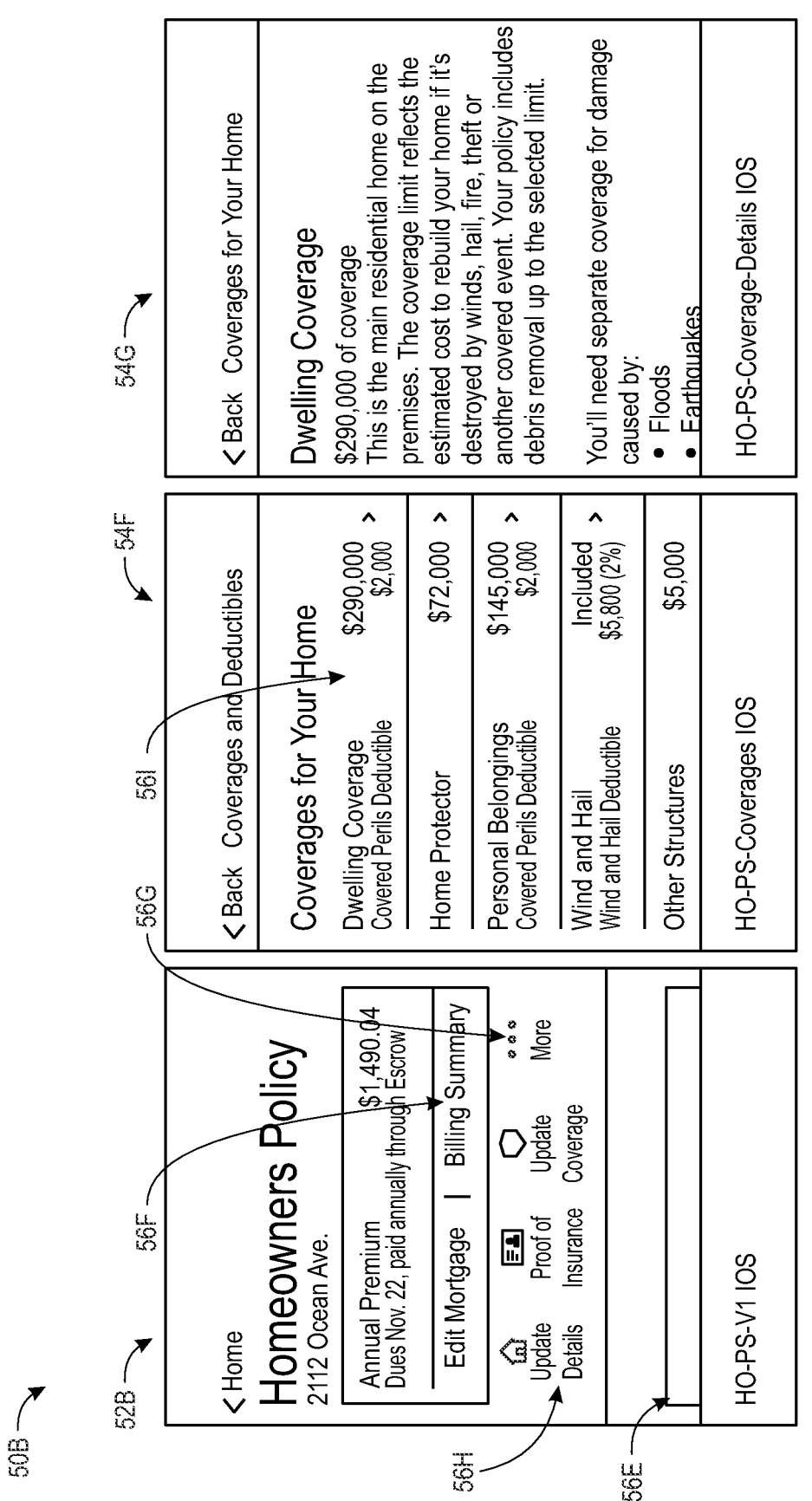

FIG. 4A and FIG. 4B are an image 50B that includes view 52B and subviews 54F, 54G, 54H, 54H, 54I (which may collectively be referred to as "subviews 54"). The view 52B is a for a homeowners insurance policy, and more information or details regarding the policy may be accessed by a user interaction with one or more user interface (UI) elements 56 (collectively referring to UI elements 56E, 56F, 56G) included in the view 52B. For example, a user may select UI element 56E to be presented with the subview 54H, which is a subview for coverages and deductibles. Alternatively, the user may select UI element 56F to view a subview for a billing summary (corresponding to subview 54J) or UI element 56G for more options that the user may edit. The subview 54H may be accessed via a user interaction with UI element 56H included in the view 52B, and the subview 54I may be accessed via a user interaction with a UI element in the subview 54C. Indeed, subview 54B may be accessed by a user interaction with UI element 56I to view coverages for belongings of the user.

FIG. 5 and FIG. 5B are an image 50C that includes view 52C and subviews 54K, 54L, 54M, 54N, 54O (which may collectively be referred to as "subviews 54"). The view 52C is a for a rental insurance policy, and more information or details regarding the policy may be accessed by a user interaction with one or more user interface (UI) elements 56 (collectively referring to UI elements 56J, 56K, 56L) included in the view 52C. For example, a user may select UI element 56J to be presented with the subview 54K, which is a subview for coverages and deductibles. Alternatively, the user may select UI element 56K to view subview 54O for a billing summary or UI element 56L to view a subview for more options that the user may edit. The subview 54K may be accessed via a user interaction with another UI element that may be included in the view 52C, and the subview 54L may be accessed via a user interaction with UI element 56M in the subview 54K. Also, subview 54M may be accessed by a user interaction with UI element in the view 52C to view details of the home being covered by the policy. Subview 54N may be accessed by a user input with UI element 56N included in subview 54M.

Returning to FIG. 2 and the discussion of the data sources 42, the data sources 42 may include data for particular views or subviews that can be provided for display on the user devices 14. In the context of FIGS. 3-5 in which an application for insurance was discussed, in one embodiment, the data source 42A may pertain to data associated with the view 52A that is for renter's insurance, the view 52B that is for a homeowners insurance policy, and the view 56C that is for insurance of a rental property. The data source 42B may pertain to data associated with the view 52A that is for renter's insurance, the view 52B that is for the homeowners insurance policy, and the view 54C that is for insurance of the rental property. Additionally, the data source 42C may pertain to data associated with the view 52A that is for renter's insurance, the view 52B that is for the homeowners insurance policy, and the view 52C that is for insurance of the rental property.

Figure 5A:
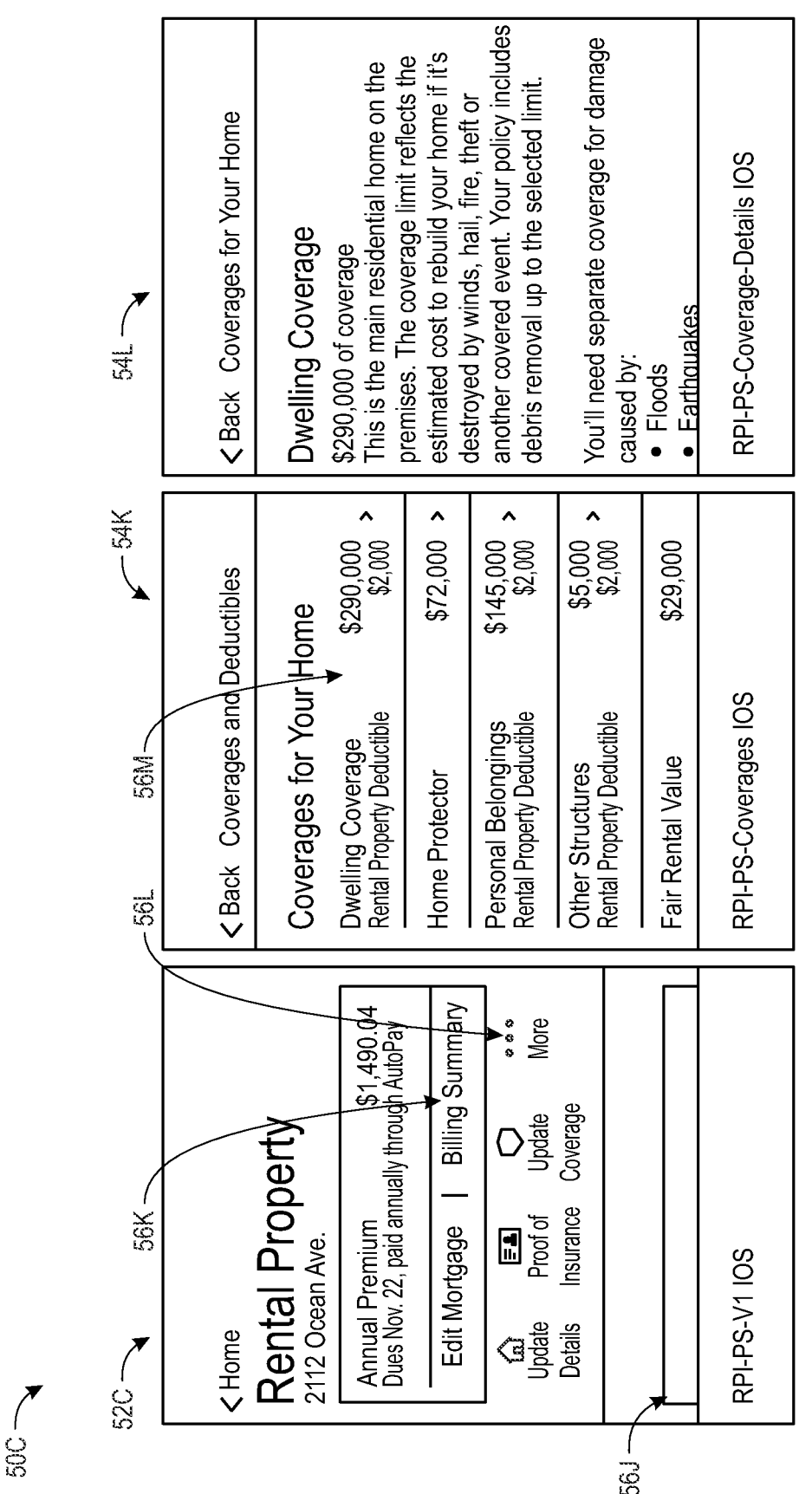

In another embodiment, the data source 42A may pertain to data associated with renter's insurance (e.g., view 52A of FIG. 3A), the data source 42B may pertain to a homeowner's insurance policy (e.g., view 52B of FIG. 4A), and the data source 42C may pertain to insurance of a rental property (e.g., view 52C of FIG. 5A). As these are provided only as examples, in other embodiments, the data sources 42 may pertain to other views in other applications, including non-insurance-related applications.

The configurators 44 may be executed by one or more processors (e.g., the processing circuitry 16 of the computing system 12 to generate views (and/or subviews for the application (or website) to be displayed on the user devices 14. For example, the views and subviews, or data for the views and subviews, may be included in the application data 24 that is to be sent to one or more of the user devices 14. In one embodiment, there may be a configurator 44 for each view and subview that may be generated as part of the application 22. In any case, the configurators 44 may define the layout of content to be present in a particular view (or subview) of the application 22 (e.g., when accessed via a website or a mobile application executed on the user device 14). As such, the underlying data included in the data sources 42 may be utilized by the configurators 44 to generate the views and subviews that may be presented on a display of the user device 14.

For example, the configurator 44A may utilize and arrange data from the data sources 42 (or only the data source 42A) to generate the view 52A of FIG. 3A, the view 52B of FIG. 4A, and the view 52C of FIG. 5A. The configurator 44B may utilize and arrange data from the data sources 42 (or only the data source 42B) to generate the view 52A of FIG. 3A, the view 52B of FIG. 4A, and the view 52C of FIG. 5A. Additionally, the configurator 44C may utilize and arrange data from the data sources 42 (or only data source 42C) to generate the view 52A of FIG. 3A, the view 52B of FIG. 4A, and the view 52C of FIG. 5A. Accordingly, when designing the application 22, developers may utilize the configurators 44, for example, to generate views in an application (e.g., a mobile version of the application 22 to be viewed on the user devices 14). Thus, rather than developing each portion of the application 22 separately, the configurators 44 may be utilized with instructions (e.g., code written by developers or data fields entered by developers) to utilize a particular portion of the data from a particular one of the data stores 42 to generate the views and subviews of the application 22. Indeed, in one embodiment, the text to appear in the view (which may correspond to subviews) may be entered by a developer, and the underlying data for the view (e.g., particular data from the data sources 42).

Figure 6:
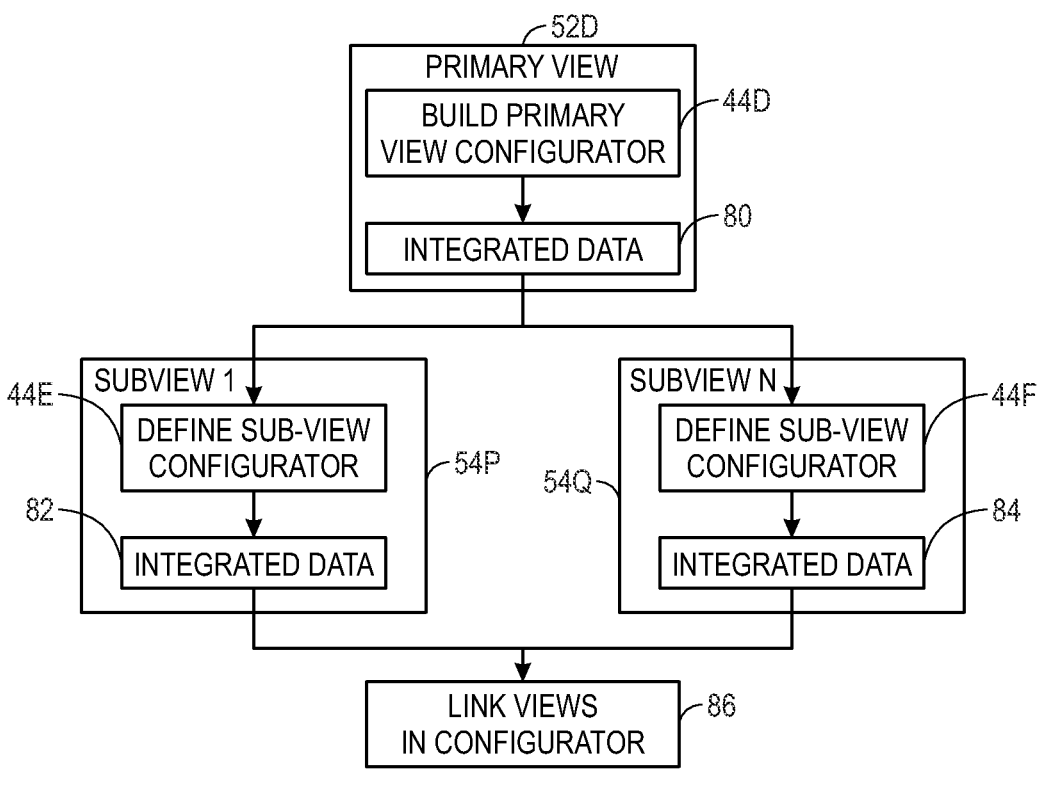
FIG. 6 is a block diagram illustrating how a view with several subviews may be generated, according to embodiments of the present disclosure.

For example, FIG. 6 is a block diagram showing how a view 52D with several subviews 56 (e.g., subview 56P and subview 56Q) can be generated using configurators 44. In particular, a configurator 44D for the view 52D may be made (e.g., by a developer) the configurator 44D may define the particular elements of the view 52D such that when an application is generated or accessed (e.g., by the user device 14), the configurator 44D may utilize data from the data sources 42 to generate data (represented by data 80) that defines the view 52D. In other words, a graphical representation of the view 52D may be generated by the user device 14 using the data 80. In the context of FIG. 3A, the view 52D of FIG. 6 may be the view 52A of FIG. 3A.

The subview 54P and the subview 54Q, which may correspond to views that are accessible from the view 52D (e.g., via a user interaction with a GUI element of the view 52D), may be generated by respective configurators 44E, 44F, which may also utilize data from the data sources 42 (e.g., to generate the subviews 54P, 54Q). Thus, the configurators 44E, 44F may respectively define the appearance of, and GUI elements included in, the subviews 54P, 54Q. The configurators 44E, 44F may also respectively generate data 82 and 84, which may be included in the application data 24 and utilized by the user devices 14 to generate graphical representations of the subviews 54P, 54Q.

The data 80, 82, 84 may be linked by the configurators 44 (referring collectively to configurator 44D, configurator 44E, and configurator 44F), thereby defining how the view 42D and subviews 54P, 54Q relate to one another. This link is represented by link 58 (e.g., linking data). In the context of FIG. 3A and FIG. 3B, the subview 54P of FIG. 6 may be the subview 54A of FIG. 3A, while the subview 54Q of FIG. 6 may be the subview 54C of FIG. 3B. Thus, the view 52D and subviews 54P, 54Q may be accessible from one another (e.g., in an application generated by the application 22 with which a user of the user device 14 may interact).

Returning to FIG. 2, the summary view model 46 may be a model (e.g., a data map) that receives data from the configurators 44 (e.g., data from the data sources 42 as organized by the configurators 44). The summary view model 46 may be generated by the processing circuitry 16 of the computing system 12, for example, using the data 80, 82, 84 and the link 86. The summary view 48, which may also be generated by the computing system 12, may be the app data 24 that may be sent to the user devices 14 to generate the views 52A, 52B, 52C. As such, the configurators 44 may utilize and organize the data from the data sources 42 to generate the views that may be included in an application that is generated using the application 22.

Before continuing with the drawings, it should be noted that any suitable number of data sources and configurators may be included in the system 40. Indeed, in one embodiment, one configurator may be utilized to each view or subview for which there is an instance. For instance, in the context of FIGS. 3-5, the views 52A, 52B, 52C may be instances of a single view, and may therefore be generated by a single configurator 44 (that accesses different data sources as defined by the instances to be able to include the correct text (e.g., view titles such as "Homeowners Policy", text of UI elements 56, or any other text appears in a view or subview). The same principle may also apply to the subviews. In other words, subviews included in an application may be instances of a subview which may have a corresponding configurator 44. Thus, a single configurator may generate subviews that are associated with different views. Furthermore, while the term "subview" has been used to refer to a view that is accessible from another view, it should be noted that views may be made from instances of subviews. In other words, in another embodiment, a view may include a layout shown herein used in a subview.

Figure 7:
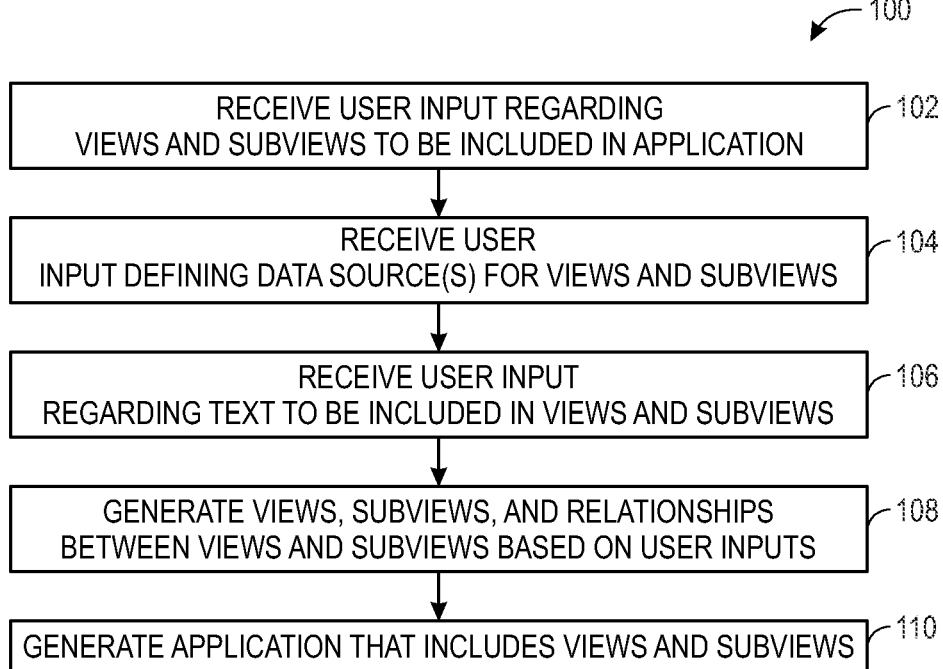
FIG. 7 is a flow diagram of a process for generating an application, according to embodiments of the present disclosure.

Bearing the foregoing in mind, FIG. 7 is a flow diagram of a process 100 for generating an application. The process 100 may be performed by the processing circuitry 16 of the computing system 12 by executing executable instructions stored in a non-transitory computer-readable medium. More specifically, the process 100 may be performed by the processing circuitry 16 executing the application 22. While the process 100 is described as being performed to generate an application, it should be noted that the process 100 may also be performed to generate a website.

At process block 102, the processing circuitry 16 may receive user input (e.g., from a device used by a developer of an application) regarding views and subviews to be included in the application to be generated. In particular, the user input may include one or more views and one or more subviews that may be included in the library of views and subviews included on the storage 20 to indicate which views and subviews will have instances in the application that is to be generated. The user input may also indicate the relationship between the instances of the views and subviews to be included in the application. For example, the user input may specify how the views and subviews in the application relate to on another. In other words, the user input may define from which views or subviews the subviews may be accessed.

At process block 104, the processing circuitry 16 may receive user input defining one or more data sources 42 for the views and subviews. In particular, the user input may specify a data source 42 (or a portion thereof, such as an address in the storage 20) for each portion of each view and subview to be included in the application so that the application will be generated as desired by the user and include correct data (e.g., as pulled from the data sources 42 designated by the user input. For instance, in the context of FIG. 3, a data source may be indicated so that the correct benefit information, including amounts covered by an insurance policy, are provided in the subview 54A.

Returning to FIG. 7 and the discussion of the process 100, at process block 106, the processing circuitry 16 may receive a user input regarding text to be included in the views and subviews of the application to be generated. For example, when a configurator 44 is to generate an instance of a view or subview to be included in the application that is to be generated, the configurator 44 may determine that text that is to be defined by the user is included in the view or subview. The configurator 44, which may be executed by the processing circuitry 16 by executing the application 22, may therefore determine text provided in the form of a user input and include the text in the proper locations within views and subviews to be generated. For example, in the context of the subview 54A of FIG. 3A, each line of text appearing in the subview 54A may be defined by text provided in the user input received at process block 106. Thus, titles (e.g., section titles), text included in UI elements 56, and other text included in views or subviews may be defined by user input and utilized by the configurators 44 when generating instances of the views and subviews. In other words, for portions of an instance of a view or subview that are to include text that is not included in or cannot be defined by an address of a data source 42, the user input may specify the text that is to appear in the instance of the view or subview in the application to be generated.

At process block 108, based on received user inputs, the processing circuitry 16 may generate instances of views and subviews as well as define the relationships between the views and subviews. In other words, the processing circuitry 16 may execute the configurators 44 associated with the views and subviews indicated by the received user inputs to generate instance of the views and subviews to be included in the application that is to be generated. Moreover, how the views and subviews relate to another may be determined based on the received user inputs. Thus, at process block 108, the processing circuitry 16 may generate the summary view model 46.

At process block 110, the processing circuitry 16 may generate an application such as an insurance application that includes the views and subviews discussed above with respect to FIGS. 3-5. For instance, the processing circuitry 16 may generate the application in for them of app data 24 which may be provided to the user devices 14. Accordingly, when the user devices 14 execute the application, the application may be displayed on the user devices and include the correct views and subviews, information on the views and subviews (e.g., as retrieved from a data source 42 or as text indicated by one of the received user inputs), and navigation between the views and subviews may be possible as indicated by the received user inputs.

Accordingly, the techniques disclosed in the present application provide for enhanced design and generation of mobile applications and websites. For example, because individual sections of the application (or website) may be generated using a from a view or subview that has defined display characteristics (e.g., UI elements, formatting, font sizes, etc.) an application (e.g., mobile application) may be developed and generated more quickly using text and/or data from data sources indicated by the user (e.g., a software designer or developer). Accordingly, certain elements of application and website design that may be considered to be repetitive may be eliminated while enabling a properly functioning application to be generated. Indeed, because views and subviews may be used, the linking between the views and subviews may be defined by user inputs, the application that is generated may function better (e.g., fewer errors or software bugs) than applications that are designed and generated using traditional methods.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A computer-implemented method, comprising:
receiving, via processing circuitry, first data indicative of a plurality of views to be included in an application, wherein the plurality of views corresponds to a plurality of user interfaces of the application, wherein each view of the plurality of views specifies a respective formatting and data fields for the corresponding user interfaces of the application;
receiving, via the processing circuitry, second data indicative of one or more data sources providing field data, text, or both to be populated in the data fields of the plurality of views to generate instances of the plurality of views to use as the corresponding user interfaces of the application;
generating, via the processing circuitry, the instances of the plurality of views by populating the data fields of the plurality of views indicated by the first data with the field data, the text, or both, based upon the second data; and
generating, via the processing circuitry, the application, wherein the application comprises the instances of the plurality of views.

2. The computer-implemented method of claim 1, wherein the respective formatting comprises a location of a title for the respective view and one or more respective user interface elements of the respective view.

3. The computer-implemented method of claim 1, wherein the data indicative of the plurality of views is indicative of a selection of one or more of views selected from a library of views.

4. The computer-implemented method of claim 3, wherein the instances of the plurality of views comprises two or more instances of a single view of the one or more views selected from the library of views.

5. The computer-implemented method of claim 4, wherein:
the second data is indicative of the text to be included in the plurality of views;
the single view comprises a text field for a title of the view; and
generating the instances of the of the plurality of views comprises:
utilizing a first portion of the text in a first respective text field for the title of a first instance of the two or more instances; and utilizing a second portion of the text in a second respective text field for the title of a second instance of the two or more instances.

6. The computer-implemented method of claim 1, wherein:
the plurality of views comprises a first view and a first subview;
the instances of the plurality of views comprise a first instance of the first view and a second instance of the first subview; and
the first instance comprises a user interface element that, when selected, causes display of the second instance of the first subview.

7. The computer-implemented method of claim 6, comprising:
receiving data indicative of a relationship between views of the plurality of views; and
enabling navigation between the first instance of the first view and the second instance of the first subview based on the data indicative of the relationship between the views of the plurality of views.

8. The computer-implemented method of claim 1, wherein generating the application comprises updating an existing application.

9. The computer-implemented method of claim 1, comprising:
generating application data corresponding to the application; and
causing the application data to be sent to one or more electronic devices to enable display of the application on the one or more electronic devices.

10. A non-transitory computer-readable medium comprising instructions that, when executed, cause processing circuitry to:
receive first data indicative of a plurality of views to be included in an application, wherein the plurality of views corresponds to a plurality of user interfaces of the application, wherein each view of the plurality of views specifies a respective formatting and data fields for the corresponding user interfaces of the application;
receive second data indicative of one or more data sources providing field data, text, or both to be populated in the data fields of the plurality of views to generate instances of the plurality of views to use as the corresponding user interfaces of the application;
generate the instances of the plurality of views by populating the data fields of the plurality of views indicated by the first data with the field data, the text, or both, based upon the second data; and
generate the application, wherein the application comprises the instances of the plurality of views.

11. The non-transitory computer-readable medium of claim 10, wherein the respective formatting comprises a location of a title for the respective view and one or more respective user interface elements of the respective view.

12. The non-transitory computer-readable medium of claim 10, wherein the data indicative of the plurality of views is indicative of a selection of one or more of views selected from a library of views.

13. The non-transitory computer-readable medium of claim 12, wherein the instances of the plurality of views comprises two or more instances of a single view of the one or more views selected from the library of views.

14. The non-transitory computer-readable medium of claim 13, wherein:
the second data is indicative of the text to be included in the plurality of views;

the single view comprises a text field for a title of the view; and the instructions, when executed, cause the processing circuitry to generate the instances of the of the plurality of views by:

utilizing a first portion of the text in a first respective text field for the title of a first instance of the two or more instances; and utilizing a second portion of the text in a second respective text field for the title of a second instance of the two or more instances.

15. The non-transitory computer-readable medium of claim 10, wherein:

the plurality of views comprises a first view and a first subview;

the instances of the plurality of views comprise a first instance of the first view and a second instance of the first subview; and the first instance comprises a user interface element that, when selected, causes display of the second instance of the first subview.

16. The non-transitory computer-readable medium of claim 15, wherein the instructions, when executed, cause the processing circuitry to:

receive data indicative of a relationship between views of the plurality of views; and enable navigation between the first instance of the first view and the second instance of the first subview based on the data indicative of the relationship between the views of the plurality of views.

17. A computing system, comprising:

processing circuitry; and a non-transitory computer-readable medium comprising instructions that, when executed, cause processing circuitry to:

receive first data indicative of a plurality of views to be included in an application, wherein the plurality of views corresponds to a plurality of user interfaces of the application, wherein each view of the plurality of views specifies a respective formatting and data fields for the corresponding user interfaces of the application;

receive second data indicative of one or more data sources providing field data, text, or both to be populated in the data fields of the plurality of views to generate instances of the plurality of views to use as the corresponding user interfaces of the application;

generate the instances of the plurality of views by populating the data fields of the plurality of views indicated by the first data with the field data, the text, or both, based upon the second data; and generate the application, wherein the application comprises the instances of the plurality of views.

18. The computing system of claim 17, wherein:

the respective formatting comprises a location of a title for the respective view and one or more respective user interface elements of the respective view; and the data indicative of the plurality of views is indicative of a selection of one or more of views selected from a library of views.

19. The computing system of claim 18, wherein:

the instances of the plurality of views comprises two or more instances of a single view of the one or more views selected from the library of views;

the second data is indicative of the text to be included in the plurality of views;

the single view comprises a text field for a title of the view; and generating the instances of the of the plurality of views comprises:

utilizing a first portion of the text in a first respective text field for the title of a first instance of the two or more instances; and utilizing a second portion of the text in a second respective text field for the title of a second instance of the two or more instances.

20. The computing system of claim 17, wherein:

the plurality of views comprises a first view and a first subview;

the instances of the plurality of views comprise a first instance of the first view and a second instance of the first subview;

the first instance comprises a user interface element that, when selected, causes display of the second instance of the first subview; and generating the application comprises updating an existing application.

* * * * *